Figure 1:
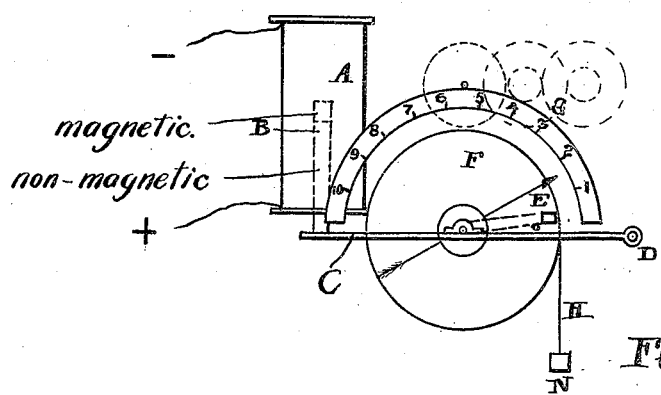

W. W. LACKIE & D. J. STEELE.
ARRANGEMENT FOR INDICATING AND RECORDING PERMANENTLY THE MAXIMUM DEMAND
FOR ELECTRICAL ENERGY ON ANY CIRCUIT.
APPLICATION FILED JAN. 31, 1908.

933,845.  Patented Sept. 14, 1909.

4 SHEETS—SHEET 1.

W. W. LACKIE & D. J. STEELE.
ARRANGEMENT FOR INDICATING AND RECORDING PERMANENTLY THE MAXIMUM DEMAND
FOR ELECTRICAL ENERGY ON ANY CIRCUIT.
APPLICATION FILED JAN. 31, 1908.

933,845.

Patented Sept. 14, 1909.

4 SHEETS—SHEET 2.

W. W. LACKIE & D. J. STEELE.
ARRANGEMENT FOR INDICATING AND RECORDING PERMANENTLY THE MAXIMUM DEMAND FOR ELECTRICAL ENERGY ON ANY CIRCUIT.
APPLICATION FILED JAN. 31, 1908.
933,845.
Patented Sept. 14, 1909.
4 SHEETS—SHEET 3.
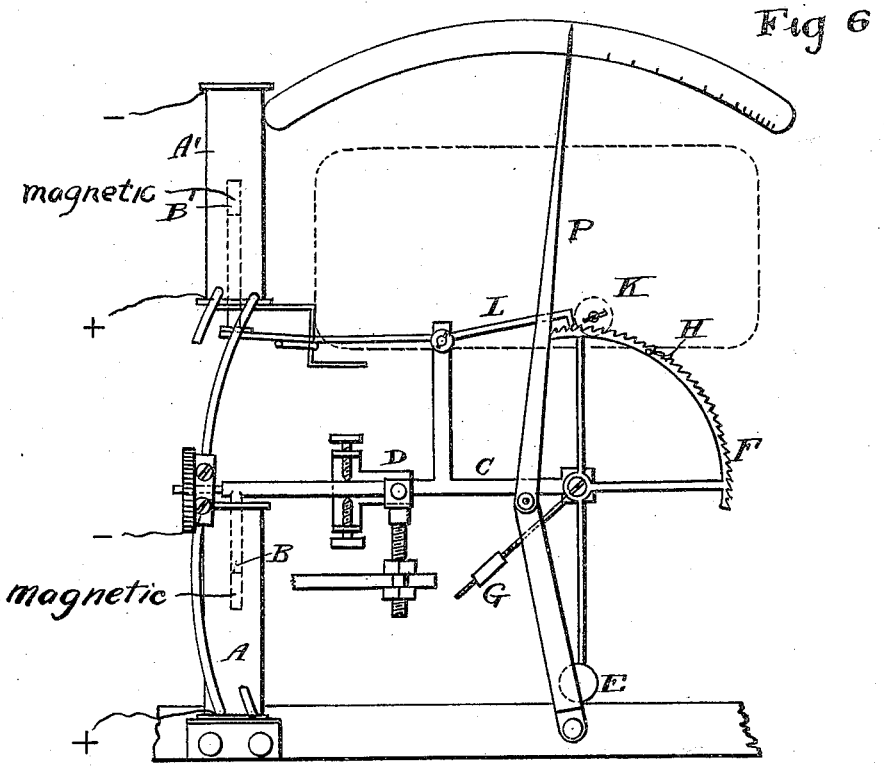
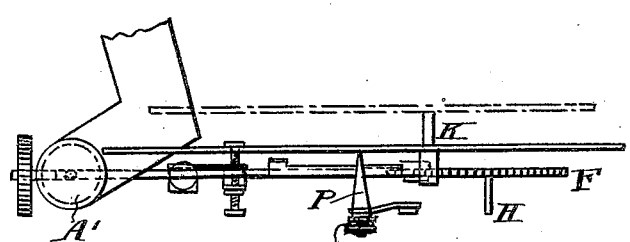
Witnesses:
Inventors
William Walker Lackie
David John Steele
by Knight Bros
Attorneys.

W. W. LACKIE & D. J. STEELE.
ARRANGEMENT FOR INDICATING AND RECORDING PERMANENTLY THE MAXIMUM DEMAND FOR ELECTRICAL ENERGY ON ANY CIRCUIT.
APPLICATION FILED JAN. 31, 1908.

933,845.

Patented Sept. 14, 1909.

4 SHEETS—SHEET 4.

UNITED STATES PATENT OFFICE.

WILLIAM WALKER LACKIE AND DAVID JOHN STEELE, OF GLASGOW, SCOTLAND.

ARRANGEMENT FOR INDICATING AND RECORDING PERMANENTLY THE MAXIMUM DEMAND FOR ELECTRICAL ENERGY ON ANY CIRCUIT.

933,845.     Specification of Letters Patent.     Patented Sept. 14, 1909.

Application filed January 31, 1908. Serial No. 413,634.

*To all whom it may concern:*

Be it known that we, WILLIAM WALKER LACKIE and DAVID JOHN STEELE, both of 75 Waterloo street, in the county of the city of Glasgow, Scotland, electrical engineers, have invented certain new and useful Improvements in and Relating to Arrangements for Indicating and Recording Permanently the Maximum Demand for Electrical Energy on any Circuit, of which the following is a specification.

Our invention relates to improved apparatus for the measuring and recording of a current of electricity in a circuit in any predetermined period of time so that the maximum demand of any circuit may be recorded.

The apparatus consists of a coil through which the circuit to be measured flows with a moving core or plunger attached to a beam to which there is pivoted a wheel which may be in two parts or quadrantal ratchet or ratchets. An arm and weight are sprung on to a separate spindle, so that as the wheel or ratchet is put into gear by action of the coil on the plunger and caused to operate with the mechanism of an electrical meter, the arm and weight are carried farther away from the fulcrum until they reach such a position as will overcome the pull on the plunger or a cord, one end of which is attached to the wheel and the other to a spring, is wound up and stretching the spring overcomes the piece on the plunger. To obtain the proper time interval the weight and arms are not allowed to run back to their zero position but the wheel is brought back to zero by a small weight or the ratchet by its own weight, or by piece of spring or other suitable means.

In order that our invention may be properly understood and readily carried into effect, we have hereunto appended four sheets of drawings, of which—

Figure 2:
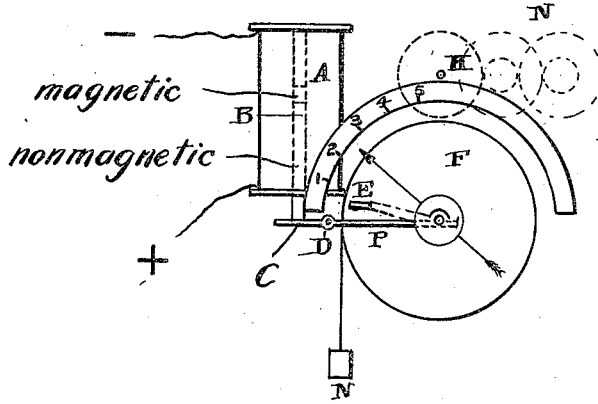
Figure 3:
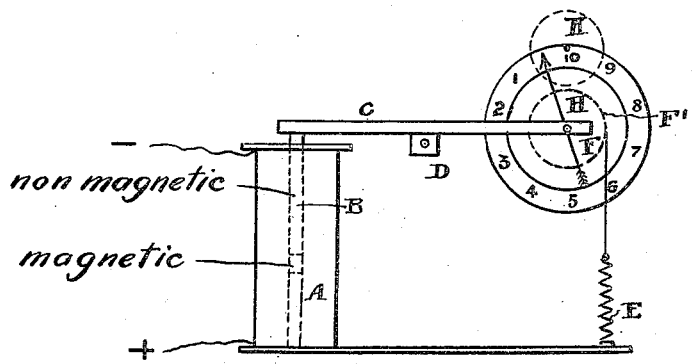
Figure 4:
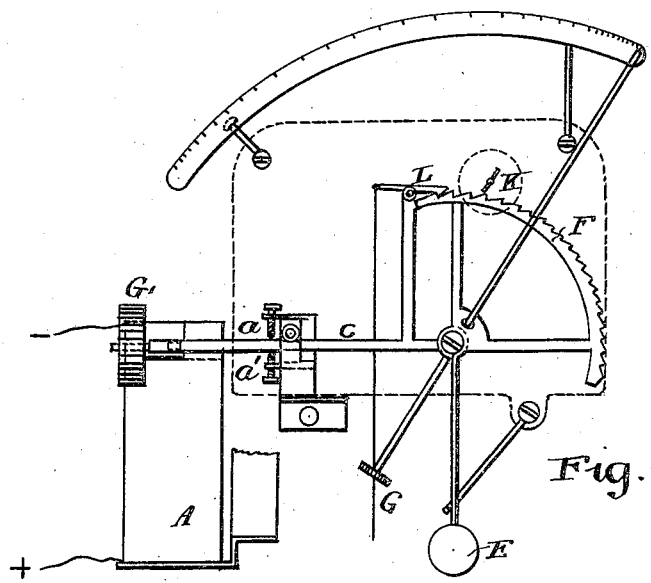
Figure 5:
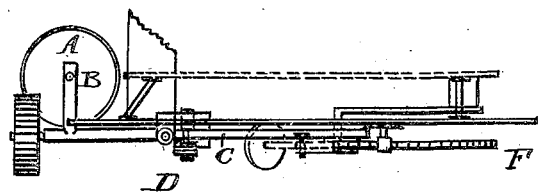
Figure 8:
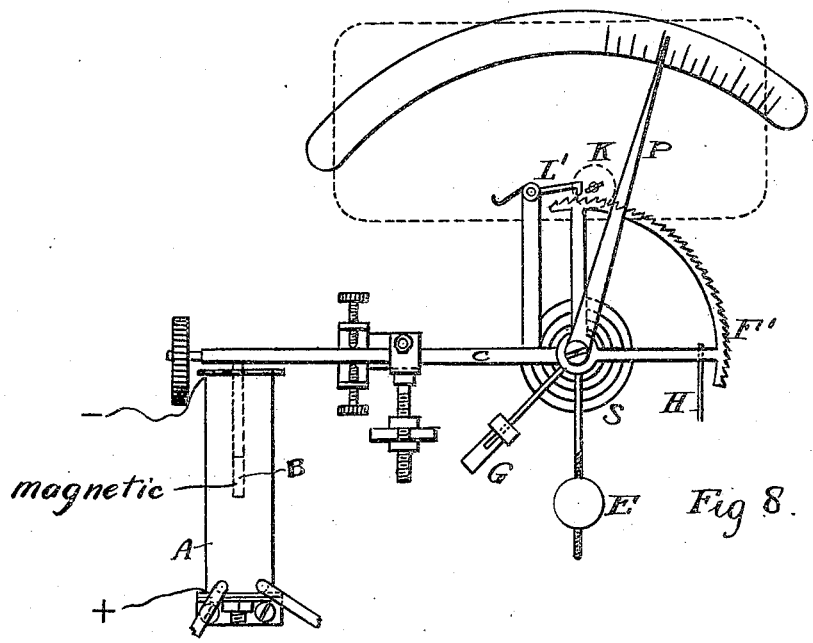
Figure 9:
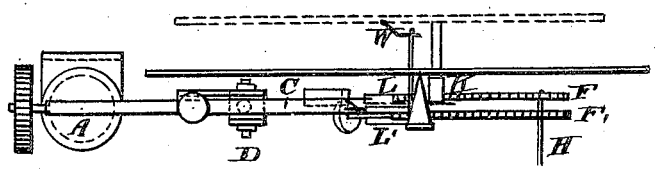

Figure 1 is a diagrammatic view of the apparatus embodying our invention. Fig. 2 is an alternative form of the apparatus illustrated in Fig. 1. Fig. 3 is an alternative form of Figs. 1 and 2. Fig. 4 is an alternative form of Fig. 1 where a quadrantal ratchet takes the place of the wheel or pulley in the previous illustration. Fig. 5 is a plan of Fig. 4. Fig. 6 is an alternative form of Fig. 4 with a time interval arrangement attached. Fig. 7 is a plan of Fig. 6. Fig. 8 is an alternative form of Fig. 7. Fig. 9 is a plan of Fig. 8.

Referring to Fig. 1, the apparatus consists of a coil A through which the current to be measured flows, with a moving core or plunger B, attached to a beam C, which is pivoted at D. About the center of this beam C a wheel F is pivoted, on a separate spindle an arm and weight E are sprung and when the wheel F is lifted into gear by action of coil A on plunger B, and caused to rotate with the mechanism of an electrical meter the arm and weight E are carried farther away from the fulcrum D, by the pin P fixed on wheel F, until they reach such a position as will overcome the pull of the plunger B. To get the proper time interval the weight and arm E are not allowed to run back to their zero position, but the wheel F is brought back to zero by the small weight N, and when an increase of current goes through the meter the wheel F has to be wound up from the beginning before it can carry the weight E past its previous position.

Referring to Fig. 2 which is an alternative form of Fig. 1 where the direction of wheel F and weight E is reversed, and the plunger B being mostly of brass having iron piece at top end. This will be easily understood from the drawing without the aid of further description.

Referring to Fig. 3 which is another form of the apparatus where the beam C is pivoted about the center, the plunger B at one end and the wheel F at the other. The wheel F in this case being in two parts, mounted side by side, and indicated by the letters F and $F^1$. When the wheel F is thrown into gear with the counter mechanism it is rotated and carries with it the wheel $F^1$, which has also a pointer attached to it. When the wheel F is rotated a cord attached to it is wound up, and the other end of the cord being fixed to a spring E, the spring is stretched until it overcomes the pull of the plunger B, and so causes F to drop out of gear. The time interval is obtained by the wheel F being brought back to zero by pull of spring E when dropped out of gear, the wheel $F^1$ and the pointer H being made to remain in position corresponding to the strength of current. Before the wheel $F^1$ and the pointer can record an increase, wheel F has to be rotated from zero again.

Referring to Figs. 4 and 5 which is another alternative form of the apparatus. In this case the wheel F is replaced by a quadrantal ratchet F. When beam C is tilted as before, the ratchet F is thrown into gear with pin drive K on counter mechanism. One edge of pin drive K catches a tooth of the ratchet F and rotates it, the pawl L locking the teeth of the ratchet F as they pass, at the same time the weight E is being carried away from the dead center till it overcomes pull of plunger B, and F drops out of gear, the pawl L locking the last tooth that passed and keeping the ratchet in a position corresponding to the strength of current passing through the solenoid, the current being recorded by pointer on scale as shown. The milled nuts G and $G^1$ are for balancing purposes and two small screws $a$, $a^1$, shown near pivot D are adjusted so as to prevent the ratchet F going too deep in gear with K, or from dropping too far out.

Referring to Figs. 6 and 7 which is another alternative form of the apparatus and consists of a quadrantal ratchet F, beam, C, coil A, and plunger B, as before. The pawl L in this case has one end extended to support a plunger $B^1$ acting in a coil $A^1$, this coil $A^1$ being connected in series with the other coil A. When current is passed through meter and therefore through coils A and $A^1$, the plunger B forces the ratchet F into gear with pin drive K, and so causes it to rotate. The plunger $B^1$ is lifted into center of coil $A^1$ clear of extended part of pawl L, and allows pawl L to fall on to ratchet F, and lock each tooth as it passes. The pointer P is fixed on a separate spindle with a small spring or sprung washer S pressing against it so as to make it comparatively stiff to move, (this will be better seen in Fig. 8). As ratchet F is rotated a small pin H (also seen in Fig. 8) carries the pointer P forward, the weight E being also carried round until it overcomes pull of plunger B, and F drops out of gear, the pointer indicating strength of current on scale as shown. When current is switched off altogether the plunger $B^1$ is dropped on to extended end of pawl L, lifting other end clear of ratchet F, which is immediately brought back to zero by its own weight. When current is switched on again the ratchet F has to be rotated up to former position before the pointer P can be carried forward.

Referring to Figs. 8 and 9 which is another alternative form of the apparatus with the addition of a second quadrantal ratchet $F^1$ mounted beside former ratchet E, (seen in Fig. 9). When the current is passed through coil A, ratchets F, and $F^1$, are lifted by action of plunger B, ratchet F gearing with pin drive K and pawl L. In this case when F is out of gear with K it is also out of gear with pawl L, the pawl being prevented from dropping with F by a small wire catching a cross piece W (shown in Fig. 9). As F is rotated by pin drive K, a small pin H fixed on F, (seen in Fig. 9) catches ratchet $F^1$ and carries it forward along with pointer P, which is attached to it, the ratchet $F^1$ being caught by pawl $L^1$ as it passes, when weight E, which is attached to ratchet F, is carried outward, as before, till it overcomes pull of plunger B, causing ratchet F to drop out of gear with K, and also with pawl L, and is carried back to zero by spring S, which is fixed on its axis. The ratchet $F^1$ is held by pawl $L^1$ and pointer P, indicating strength of current. When an increase of current takes place ratchet F is wound up from zero until it catches $F^1$, and carries it forward to new position, the ratchet F dropping out and coming back to zero again when maximum current is registered. The pointer P and ratchet $F^1$ are brought back to zero when required by lifting the pawl $L^1$ out of gear. In order to vary the speed at will or to give it any definite time the gear wheel K can be increased or reduced in size as may be required.

Claims.

1. In an instrument of the character described, the combination with an electric meter, of means for indicating the maximum current supply, said means comprising a solenoid, a wheel mounted adjacently thereto and provided with a weight for resisting its rotation, a pivotally-mounted cross-bar upon which the wheel is rotatably mounted, a magnetic plunger within said solenoid and mounted upon said cross-bar to bring said wheel into engagement with the meter by the action of the solenoid and means connected with the wheel whereby it is thrown out of engagement with the meter.

2. In an instrument of the character described, the combination with an electric meter, of a solenoid, a beam pivotally mounted adjacent to said solenoid and carrying a magnetic plunger projecting into the solenoid, a wheel rotatably mounted upon said beam and adapted to be brought into driven relation with the meter, means for exerting a gradually augmented pull upon the wheel tending to pull said wheel out of engagement with the meter.

3. In an instrument of the character described, the combination with an electric meter of an oscillating beam adjacent thereto, a wheel carried by said beam and normally out of engagement with said meter, a solenoid, a plunger in said solenoid and carried by said beam whereby said wheel is adapted to be brought into engagement with the meter when the solenoid is excited, and a weight connected with said wheel in such manner as to have its leverage increased whereby the wheel becomes finally drawn out of engagement with said meter.

4. In an instrument of the character described, the combination with an electric meter, of means for indicating the maximum current supply, said means comprising a solenoid, a curved member movably mounted adjacent to said solenoid and provided with a weight for resisting its movement, a pivotally mounted cross-bar upon which the curved member is mounted, a magnetic plunger within said solenoid and mounted upon said cross-bar to bring said curved member into engagement with the meter by the action of the solenoid, and means connected with the curved member whereby it is thrown out of engagement with the meter.

In witness whereof we have hereunto set our hands in the presence of two witnesses.

WILLIAM WALKER LACKIE.
DAVID JOHN STEELE.

Witnesses:
JOHN LIDDLE,
JOHN I. LIDDLE.